United States Patent [19]

Hofer

[11] 4,042,746
[45] Aug. 16, 1977

[54] COMPOSITE MATERIAL AND METHOD OF FORMING

[75] Inventor: Peter H. Hofer, Grosse Pointe Farms, Mich.

[73] Assignee: The John Z. DeLorean Corporation, Bloomfield Hills, Mich.

[21] Appl. No.: 630,056

[22] Filed: Nov. 7, 1975

[51] Int. Cl.² .............................................. B32B 3/26
[52] U.S. Cl. ................................... 428/311; 156/295; 156/309; 156/313; 428/212; 428/218; 428/315
[58] Field of Search ............... 428/212, 213, 214, 215, 428/216, 217, 218, 310, 311, 315; 156/295, 309, 313

[56] References Cited

U.S. PATENT DOCUMENTS

| 3,194,708 | 7/1965 | Fourcade et al. | 428/315 |
| 3,627,622 | 12/1971 | Vega | 428/311 |
| 3,661,674 | 5/1972 | Higgs et al. | 428/311 |
| 3,867,221 | 2/1975 | Chant | 428/311 |
| 3,915,783 | 10/1975 | Goppel et al. | 428/311 |
| 3,944,704 | 3/1976 | Dirks | 428/315 |

Primary Examiner—William J. Van Balen
Attorney, Agent, or Firm—Reising, Ethington, Barnard, Perry & Brooks

[57] ABSTRACT

A composite structure comprising a rigid closed-cell foam core element to which is bonded an initially resilient open-cell foam material and a layer of high strength reinforcing material which are compressed against the core element so as to cause a thermosetting resinous material to form a resin matrix extending throughout the open-cell material and reinforcing layer to bond the composite layers together.

4 Claims, 3 Drawing Figures

COMPOSITE MATERIAL AND METHOD OF FORMING

BACKGROUND OF THE INVENTION

The subject matter of the invention relates to the construction and method of fabricating laminated composite structures of the type wherein a plurality of materials are joined together to provide an integral structure having the composite physical and chemical characteristics of the materials utilized. The invention is more specifically concerned with composites predominantly utilizing non-metallic materials such as high strength glass fibers, open and closed cell resin foams and thermosetting resin binders.

Numerous methods and techniques are presently available for making shapes or structures utilizing resin impregnated fiberglass. Typical of such methods are the hand lay-up methods whereby vehicle and boat bodies are made by the laborious process of laying fiberglass sheets within a mold and applying intermediate layers of resin thereto until the requisite thickness is achieved and then allowing the composite to cure within the mold. Another method produces a composite material known as Sheet Molding Compound whereby resin impregnated fiberglass is subjected to high molding pressure in the nature of 1000–2000 lbs. per square inch, and then cured. These and other composite molding techniques have various disadvantages including one or more of the following: slowness of fabrication, high labor content, or expensive tooling particularly where high molding pressures are employed. In common, previous composite molding techniques have limited the structural forms of materials which can be combined to realize a composite structure.

Particular difficulty arises with previous technologies where it is desired to make a composite structure requiring high strength, surface hardness or impermeability and structural rigidity, the latter characteristic which normally requires the part to be of a relatively thick cross-section or otherwise be reinforced.

The present invention is directed to a composite structure which utilizes a lightweight, rigid core element to which a high strength and impervious outer skin is molded. To achieve this result two primary objectives must be achieved. First, the process whereby the high strength outer skin is formed upon the lightweight core element must be accomplished in a way as not to crush the core element. Secondly, the high strength skin must be so bonded to the core element to provide a high shear or peel strength to reduce the possibility of delamination.

DESCRIPTION OF THE PRIOR ART

The concept of a composite material comprising a rigidified foam core having a reinforced fiberglass outer surface or skin is described in U.S. Pat. No. 3,269,887 Windecker. Windecker, however, creates his rigidified core element by beginning with an open-cell resilient foamed resin material wherein the open cells are coated, but not filled, with a resin which is cured to provide a rigidified, lightweight structure. Windecker suggests such structure may be combined with an outer reinforcing layer of glass fibers which are independently impregnated with a thermosetting resin and adhered to the resin impregnated core. One of the problems with this approach is the necessity of beginning the formation of the core element with a resilient foam, the open cells of which must be individually coated with a resin to provide the ultimate rigidity to the core element which makes it difficult to maintain a predetermined thickness or cross-sectional configuration in the core element. A core element made in accordance with the Windecker patent is a two-phase material with one phase being the open-cell foam and the second phase being the resin matrix. The resin matrix extending throughout the foam phase inevitably adds weight and cost to such structure.

Applicant, on the other hand, begins the formation of his composite material with a rigidified, single-phase, closed-cell foam core element which can withstand the relatively low compressive forces utilized in applying a high strength, reinforced outer layer in accordance with the invention.

Schafer U.S. Pat. Nos. 3,193,437 and 3,193,441 illustrate the concept of an initially resilient and open-cell foam material impregnated with a thermosetting resin, used alone or in combination with reinforcing fibers, and wherein the foam layer is compressed under relatively low pressures such that the thermosetting resin substantially fills the cells of the foam and which resin is cured while maintaining the resilient foam layer in a compressed condition. The Schaffer process is particularly advantageous in constructing a relatively thin walled composite member of high strength and density. At the same time it is possible to utilize the Schafer teaching to build up composite parts of considerable thickness. However, since in the Schafer process it is necessary to compress the originally resilient open-cell foam material to between ½ and ¼ of its original thickness in order to fill the cells with resin, it is necessary to use either a very thick initially resilient open-cell foam material or several layers of such material, all impregnated with a thermosetting resin, in order to achieve a relatively thick part. The disadvantages of using the Schafer process to produce a part of thick cross-section is that such part (1) becomes heavy relative to its strength and rigidity, (2) is costly due to the essentially solid resin matrix which extends throughout the part and (3) is a poor insulator as indicated by a low K factor.

While theoretically possible to make composite parts of relatively unlimited thickness using the molding process taught by Schafer, in practice parts with thicknesses beyond 7 to 8 mm (0.315 inch) lose certain of their important advantages including an important reduction in the strength-to-weight ratio as thickness increases.

SUMMARY OF THE INVENTION

In accordance with the present invention it is possible to make a lightweight, high strength composite structure of considerable thickness wherein the bonding resin is limited to the outer reinforcing layer and the foam core remains essentially unpermeated by such resin. As a result the strength-to-weight of a relatively thick part remains essentially that of a much thinner cross-section part since the unimpregnated foam core element which gives the composite most of its thickness is very light.

While composite structures of a broad range of thicknesses and cross-sectional configurations are possible with the present invention, parts in the 5 to 10 inch thickness range are readily made thereby. Furthermore, by utilizing a closed-cell foam core element the thermosetting resin which bonds the high-strength reinforcing layer to the core element has very limited permeation of the core element, thereby greatly reducing the amount of bonding resin used by concentrating the same at the outer layer of the composite where high strength and impermeability are normally required. Inasmuch as the method whereby the high-strength reinforcing outer layer or skin is formed and bonded to the closed-cell foam core element is achieved with relatively small compressive forces, e.g. 20–150 psi, a large variety of lightweight, closed-cell foam core elements may be used resulting in a lightweight, high-strength rigidified composite.

More specifically, in accordance with the present invention, a relatively fragile closed-cell, rigid foam, e.g. polyurethane, of essentially any desired thickness may be utilized as the core element. An initially resilient and open-cell foam layer, e.g. polyurethane, overlays at least one surface of the core element, either before or after being overlayed on the core element, the open-cell foam is impregnated with a suitable polymerizable liquid resin system, e.g. vinylester, polyester or epoxy. A layer of high-strength, reinforcing material, e.g. fiberglass fibers, is then placed over the impregnated open-cell layer and the entire composite structure subjected to sufficient compressive force to substantially reduce the thickness of the impregnated foam layer. In so doing, the open cells are substantially completely filled with resin and the excess of such resin is extruded inwardly toward the surface of the core element and outwardly so as to impregnate the reinforcing filaments. Since the pressure, preferably in the range of 50–100 psi, necessary to compress the open-cell foam layer and extrude the resin is of such a relatively low value, no crushing of the core element occurs. While maintaining the composite structure under compression, the resinous material is heat cured thereby creating a bonding matrix extending from the reinforcing layer to the core element and thereby bonding the reinforcing layer to the core element.

Inasmuch as the compression and bonding pressures utilized in the present invention are sufficiently low as not to crush the core element, the core element itself can be pre-molded or preshaped to provide the ultimate contour desired of the finished composite.

In accordance with the present invention, the high cost and relatively heavy bonding resin is only at the outer layer of the composite and there, in combination with the reinforcing layer, provides the requisite impermeability and strength to the structure. Accordingly, the thickness of the part and its consequent rigidity can be varied by varying the amount, e.g. thickness, of the lightweight and relatively low cost closed-cell foam element without substantially increasing the cost or weight of the composite part.

The details of the invention will be more clearly understood by a perusal of the ensuing detailed description and illustrative drawings.

Figure 1:
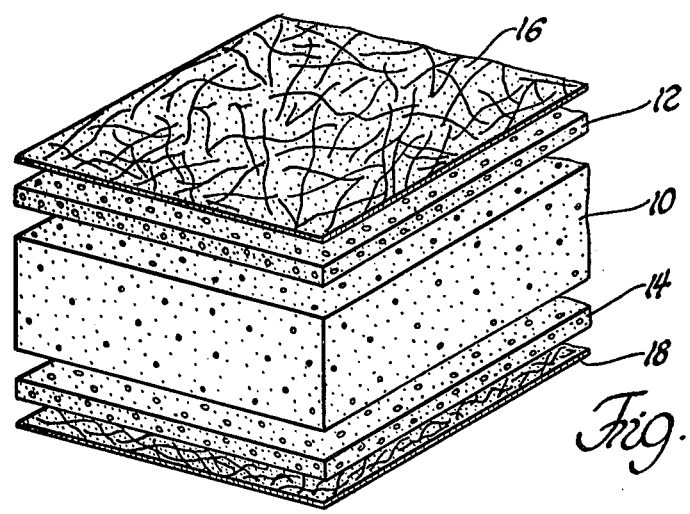
FIG. 1 is an exploded perspective view of composite materials prior to molding.
Figure 2:
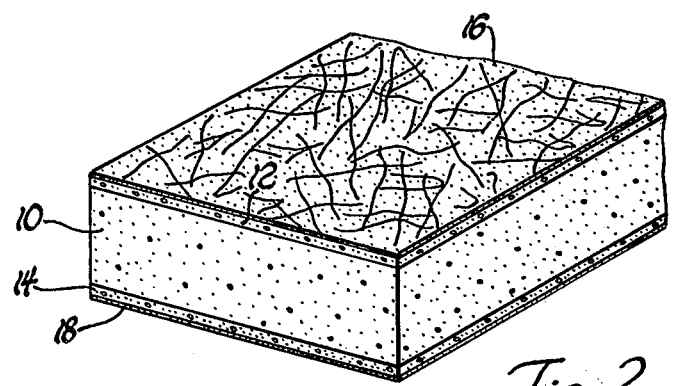
FIG. 2 is a perspective view of the molded composite.

Referring to the drawings, FIG. 2 illustrates a typical form of high strength, lightweight composite structure made in accordance with the invention. FIG. 1 represents an exploded view of the various components used in the composite prior to bonding, whereas FIG. 2 shows the composite of FIG. 1 after molding.

While the invention is applicable to composite structures of varying thicknesses and configurations, it is particuarly significant in making parts of relatively thick cross-section. Increased part thickness may be necessary for reasons such as strength, rigidity, sound insulation or thermal insulation. Ideally, such thickness is to be realized with a minimum addition of weight and cost to the composite component. In order to provide bulk or thickness to the composite structure in accordance with the present invention, a lightweight, closed-cell foam core element 10 is utilized. Core element 10 is rigid and is intended to retain its shape and size during the subsequent molding formation of the composite. Core element 10 may be of any suitable rigid foam material such a polyurethane, polystyrene, polyethylene, polypropylene, phenolic to use a few examples. It is also contemplated within the scope of the invention that other core element materials may be used and including foamed metals, foamed glass, foamed ceramics and various honeycombed structures. The main criteria for the construction of the core element are that it be rigid, lightweight, therefore probably of a cellular construction, and compatible with and substantially impermeable to the resin system used elsewhere in the composite.

An important reason why such a large variety of materials, including some that are semi-fragile, may be used with the present invention is the fact that the molding pressures involved in the process are very low in not exceeding 150 psi.

It is also important to note that the cells of core element 10 be closed, i.e., sealed from each other. In other words, while the construction of the core element is such as to include hollow spaces or voids, most of these voids or hollow spaces do not communicate with each other and, thus, are not coated or filled with the thermosetting resin which is used elsewhere in the system. The primary importance of the closed-cell construction is to eliminate the excess weight and cost which would occur if the thermosetting resin could permeate throughout the core element.

It is also to be understood that inasmuch as the rigid foam core element 10 retains its original shape during the formation of the composite, the core element can initially be molded or otherwise shaped to the ultimately desired contour for the completed composite structure.

Particularly with reference to the resin-type, rigid core element foams, such as polyurethane, densities as low as 0.9 lb. per cu. ft. have been used successfully with densities of 1.5 to 2.0 lbs. per cu. ft. being preferred. Heavier densities can be used depending upon ultimate strength required and with heavier densities frequently being used with thinner cross-section parts.

Referring again to FIGS. 1 and 2 of the drawings, open-cell and initially resilient foam layers 12 and 14 are adapted to overlay the opposite sides of core element 10. In referring to the open-cell character of the resilient foam layers 12 and 14 is meant that in general at least 85% of the foam cells are in open communication with adjacent cells. It has been found that a flexible or resilient polyurethane foam is highly satisfactory for practice with the subject invention. However, other open-cell resilient foams may be used so long as they are compatible with the thermosetting resin with which such foam is to be impregnated.

In referring to "rigid" as opposed to "resilient" foam or other core element materials is meant a material which resists any significant reduction in thickness when subjected to the compression force used to compress and substantially reduce the thickness of the resilient foam layers 12 and 14.

Open-cell foam layers 12 and 14 may be considered to be reservoirs for the liquid thermosetting resin during the molding process. The thickness of the open-cell layers 12 and 14 will generally be determined by the amount of reinforcing layer required to be impregnated with resin and also the amount of shape discrepancy between the plug and mold to be used in the molding process. It is common, however, to use an open-cell resilient foam layer of one inch or less initial thickness and having a density in the range of 0.5 to 5 lbs. per cu. ft.

The open-cell foam layers 12 and 14 are preferably impregnated with a suitable thermosetting resin prior to being placed upon core element 10. The resilient foam layers may be thus impregnated in any well-known fashion such as dipping, being run through a resin bath and thereafter passed between squeezing rolls to control the amount of liquid resin retained within the foam layer or gravure roll coated.

Again depending upon compatibility with the other composite materials, available cure time, physical strength requirements in the reinforcing layer and cost, a variety of satisfactory polymerizable resin systems may be used to impregnate the open-cell foam layers 12 and 14. It is highly satisfactory with the present invention to utilize either vinylester, polyester or epoxy resins for impregnating purposes.

As to compatibility, for example, it is apparent that in using a vinylester resin system, which has a polystyrene monomer component, core element foam such as polystyrene foam cannot be used inasmuch as the styrene monomer would dissolve the foam. Furthermore, vinylester systems as a rule require polymerization temperatures, to effect a cure, which are high enough to melt certain foams. Thus, the bonding resins must be appropriately matched so as to be chemically and physically compatible with the foamed core element 10. In the case of a polystyrene rigid closed-cell core element, an epoxy based resin system can be used so as not to harm the foam core.

Reinforcing layers 16 and 18 are adapted to overlay the open-cell foam layer as shown in FIG. 1. A preferred reinforcing layer is comprised of glass fiber mats or woven cloth. Depending in part on the ultimate exterior surface appearance desired, other reinforcing materials may be utilized either in combination with the high strength glass fibers or instead thereof. For example, it has been found that a thin, e.g., 0.010 inch, sheet of metal such as stainless steel, can overlay the fiberglass layer giving the composite the appearance of a metal structure. It has also been found that if a thicker, e.g., 0.035 inch, steel outer layer is used, the glass fiber reinforcing layer may be omitted. For other purposes, such as electrical shielding, an aluminum foil 0.002 inch thick may overlay and be bonded to the reinforcing layer during the compression molding operation.

Figure 3:
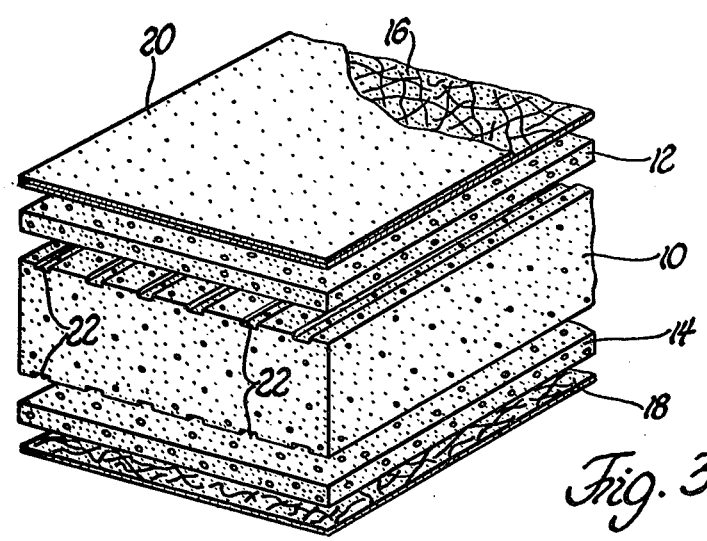
FIG. 3 is a modified form of the invention.

As a further variation in surface treatment, decorative layers such as vinyl sheets or wood veneer, indicated at 20 in FIG. 3, can overlay the fiberglass reinforcing layer and be bonded thereto by the thermosetting resin extruded from reservoir layers 12 or 14.

Referring to the composite components in the condition shown in FIG. 1, the process whereby the components are bonded together will now be described. With the parts in the position of FIG. 1, the composite sandwich is placed within a suitable mold or between a pair of platens. The sandwich is then placed under a compression load of preferably between 50 and 100 psi which reduces the thickness of the resin impregnated resilient foam layers 12 and 14 to between 50% and 10% of their original thickness.

In so compressing layers 12 and 14, the resin contained therein fills substantially all of the now flattened open-cells and the excess resin is extruded outwardly and inwardly of the compressed layer. In being extruded inwardly toward the foam core element, the closed-cells of the latter prevent any significant permeation by the resin. On the other hand, in compressing layers 12 and 14 a substantially equal hydraulic driving force is created throughout the liquid thermosetting resin causing the same to drive out entrapped air and to thereby thoroughly wet and permeate the surface interstices of the adjacent core element surface. In thus completely wetting the adjacent core element surface, greatly improved bond strength is achievable between the core element 10 and the reinforcing layers 16 and 18.

With the composite sandwich maintained under the compressive loading, the resin is heat cured to provide a hardened resin matrix which bonds the reinforcing layers 16 and 18 to core element 10. The composite structure of FIG. 2 results and includes the strong, dense and resin imbedded outer layers 16 and 18 which surround and protect the open-cell core element 10.

Should even greater bond or peel strength be desired between the core element 10 and the reinforcing layers 16 and 18, the subadjacent surfaces of the core element can be roughened or grooved, as indicated at 22 in FIG. 3, to enhance the mechanical bonding between the resin and the core element surfaces.

The use of an initially resilient open-cell resin reservoir layer in combination with a rigid closed-cell core element is vital to achieving a high quality composite part. As already noted, bond strength between the reinforcing layer and core element is enhanced through the thorough wetting by the resin of the adjacent core surface. Further, the resilient foam layer accommodates, i.e., fills in, undesired contour differences or discrepancies between the core element and the reinforcing layer resulting in a very smooth and accurately contoured outer surface on the composite part.

While numerous compatible combinations are possible within the scope of the present invention, the following is an example of materials combined to provide a high-strength, lightweight composite useful as structural component:

1. Core element--
   closed-cell polyurethane foam 1 inch – 2 inches thick with a density of 2 lbs. per cu. ft.
2. Reservoir foam layer--
   open-cell resilient polyurethane (polyether type) foam ½ inch thick, or two ¼ inch layers, with a density of 1.8 lbs. per cu. ft.
3. Reinforcing layer--
   fiberglass mat with chopped or continuous fibers and having a weight of 1 ounce per sq. ft.
4. Thermosetting resin--
   epoxy resin system based on 828 (Shell) resin with an adducted diethylenetriamene plus fillers and extenders as desired.

While it is normally desirable to provide a composite structure with resin imbedded reinforcing layers on both sides of the core element, it is within the scope of the invention also to provide such a structure with a reinforcing layer on only one side of the core element.

Other modifications are possible within the intended scope of the invention as set forth in the hereinafter appended claims.

What is claimed is:

1. A composite structure comprising a rigid closed-cell core element, an initially resilient open-cell foam material overlaying at least one face of said core element, a layer of high-strength reinforcing material overlaying said open-cell foam material, a polymerizable resinous material impregnating the open-cell material, said resinous material having been cured while maintaining the structure under sufficient compression to substantially reduce the thickness of the initially resilient foam to thereby substantially fill the open cells and extrude excess resinous material from the compressed layer to bond the high-strength reinforcing material to the rigid closed-cell core element without significant permeation of the closed-cell core element.

2. A composite structure comprising a rigid closed-cell core element, an initially resilient open-cell foam material overlaying at least one face of said core element, a pervious layer of high-strength filaments overlaying the open-cell foam material, an impervious outer layer overlaying said high-strength elements, a polymerizable resinous material impregnating the open-cell material, said resinous material having been cured while maintaining the structure under sufficient compression to substantially reduce the thickness of the initially resilient foam material to thereby substantially fill the open-cells and extrude excess resin outwardly of the compressed layer to permeate the high-strength filament layer and bond the impervious outer layer to the closed-cell core element without significant permeation of the closed-cell core element.

3. A composite structure comprising a closed-cell single continuous phase rigid core element, a reinforcing layer overlaying at least one face of said core element, said reinforcing layer including a compressed open-cell resilient foam sheet proximate said one face of the core element, a sheet of reinforcing material overlaying said compressed foam sheet, and a cured thermosetting resin phase filling the cells of said resilient foam sheet, said cured resin phase providing a matrix bonding said reinforcing material to said core element without significant permeation of the closed-cell core element.

4. A composite lightweight, high-strength structure comprising a rigid closed-cell foam core element having a plurality of shallow recesses formed in at least one surface thereof, an initially resilient open-cell foam material overlaying said one surface of the core element, a layer of high-strength reinforcing material overlaying the open-cell foam material, a polymerizable resinous material impregnating said open-cell material, said resinous material having been cured while maintaining said structure under sufficient compression to substantially reduce the thickness of said open-cell material to thereby substantially fill all the open-cells with the resinous material and to extrude excess resinous material outwardly of the compressed layer to fill the core element recesses and bond the reinforcing material to the core element through a cured resin matrix without significant permeation of the closed-cell core element.

* * * * *